(12) United States Patent
Cho

(10) Patent No.: US 8,264,634 B2
(45) Date of Patent: Sep. 11, 2012

(54) BACKLIGHT UNIT AND LIQUID CRYSTAL DISPLAY DEVICE HAVING THE SAME

(75) Inventor: Hyoung Je Cho, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 685 days.

(21) Appl. No.: 12/180,253

(22) Filed: Jul. 25, 2008

(65) Prior Publication Data

US 2009/0027585 A1    Jan. 29, 2009

(30) Foreign Application Priority Data

Jul. 27, 2007    (KR) .................. 10-2007-0075493

(51) Int. Cl.
*G02F 1/1333* (2006.01)
(52) U.S. Cl. ........................................... 349/58; 349/65
(58) Field of Classification Search .................. None
See application file for complete search history.

(56) References Cited

U.S. PATENT DOCUMENTS

| 7,182,500 | B2* | 2/2007 | Sugawara | 362/634 |
| 2002/0080298 | A1* | 6/2002 | Fukayama | 349/58 |
| 2003/0160908 | A1* | 8/2003 | Peng | 349/58 |
| 2005/0134761 | A1* | 6/2005 | Won et al. | 349/58 |
| 2007/0002207 | A1* | 1/2007 | Kim et al. | 349/58 |

OTHER PUBLICATIONS

English Machine Translation of Japanese document JP 05-142559.*

* cited by examiner

*Primary Examiner* — Lucy Chien
(74) *Attorney, Agent, or Firm* — Birch, Stewart, Kolasch & Birch, LLP

(57) ABSTRACT

A backlight unit that is designed to fix a light guide plate without using separate pads is provided. The backlight unit includes at least one light source, a light guide plate provided in parallel to the light source, a support main enclosing the light guide plate, and a plurality of fixing protrusions that are formed on an inner edge of the support main to fix the light guide plate.

13 Claims, 4 Drawing Sheets

BACKLIGHT UNIT AND LIQUID CRYSTAL DISPLAY DEVICE HAVING THE SAME

CROSS-REFERENCE TO RELATED APPLICATIONS

The present application claims priority under 35 U.S.C. 119 and 35 U.S.C. 365 to Korean Patent Application No. 10-2007-0075493 (filed on Jul. 27, 2007), which is hereby incorporated by reference in its entirety.

BACKGROUND

The present disclosure relates to a backlight unit. More particularly, the present disclosure relates a backlight unit that is designed to fix a light guide plate without using a separate pad.

Generally, a cathode ray tube (CRT) among display devices that have been widely used is mainly used as a monitor for a television set, a measuring device, an information terminal device. However, the CRT is relatively heavy and big and thus it cannot meet the requirements for reducing a size and weight of the display device To solve the limitations of the CRT, liquid crystal display (LCD) devices that are thin and light and have low power consumption have been widely used. The LCD devices are getting large-sized and thicker and designed to have lower power consumption in response to demands of the users.

The LCD device is a display device that displays an image by adjusting an amount of light passing through liquid crystal. The LCD devices have been widely used due to their advantages of being thin and having the low power consumption.

Unlike the CRT, since the LCD device is not a self-emissive display device, a backlight unit having a light source is provided on a rear surface of a liquid crystal panel to emit the light to the liquid crystal panel.

The backlight unit has a light source disposed on an inner-side surface of a bottom cover formed of metal. A reflective sheet, a light guide plate, and a variety The backlight unit further includes a support main formed of a plastic material, which is coupled to the bottom cover while enclosing the light source, reflective sheet, light guide plate, and optical sheets. The support main is formed in a rectangular frame shape.

A plurality of pads are attached on an inner wall of the support main to fix the optical sheets and the light guide plate. The pads cause increases of a manufacturing cost of the backlight unit.

In addition, since the pads are attached to the support main by workers, the pads may not be attached to accurate locations of the support main. Therefore, the pads must be reattached to the support main. This is time-consuming.

SUMMARY

Accordingly, the present invention is directed to a liquid crystal display device that substantially obviates one or more of the problems due to limitations and disadvantages of the related art.

Embodiments provide a backlight unit having a support main that is designed to fix a light guide plate, thereby reducing the number of components Embodiments also provide a backlight unit that provides a light guide plate fixing structure that can fix a light guide plate using a support main, thereby reducing an assembling error, which may be caused by pads that are used in the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE EMBODIMENTS

Reference will now be made in detail to the embodiments of the present disclosure, examples of which are illustrated in the accompanying drawings.

Figure 1:
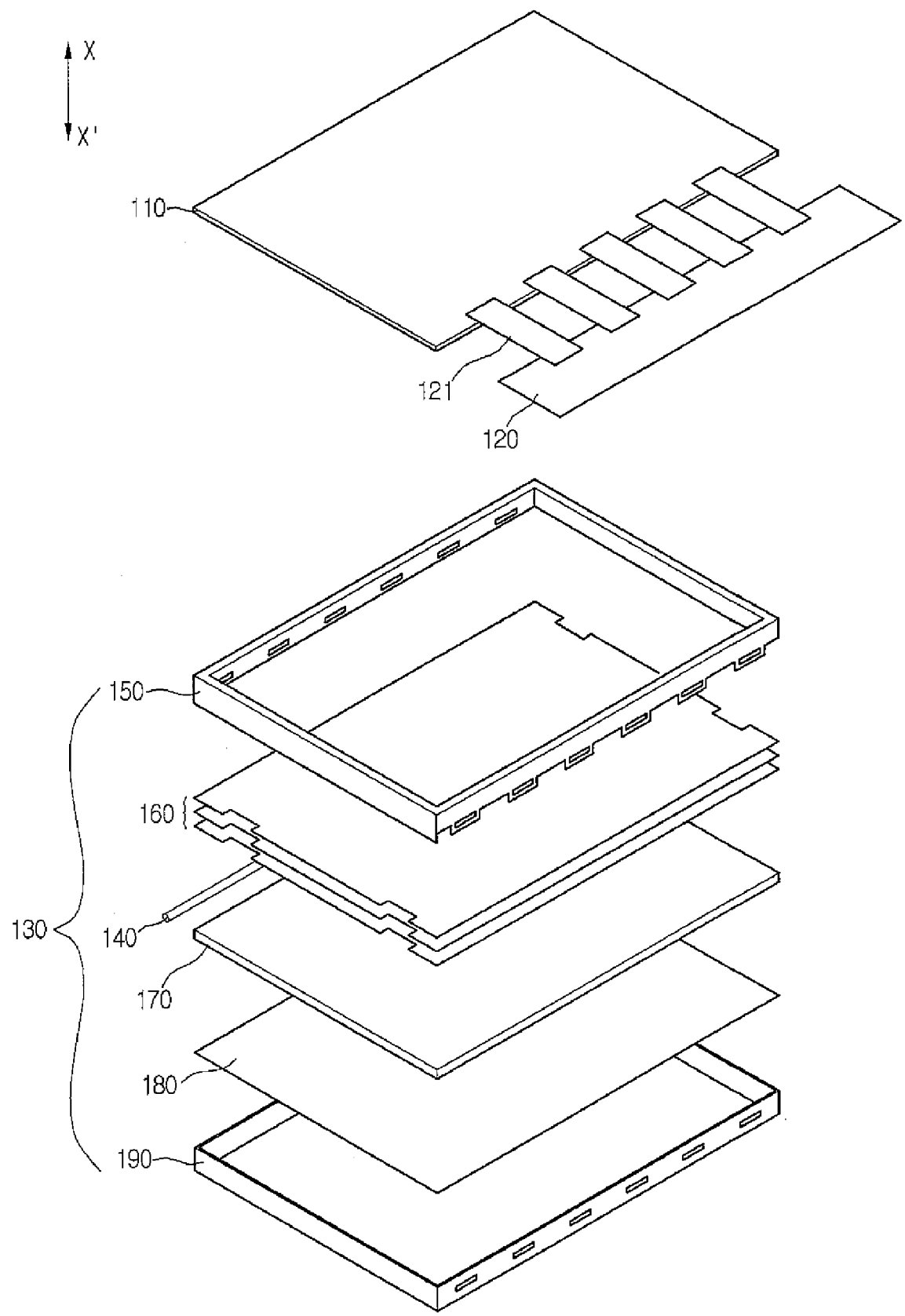
FIG. 1 is an exploded perspective view of a liquid crystal display (LCD) device according to an embodiment.
Figure 2:
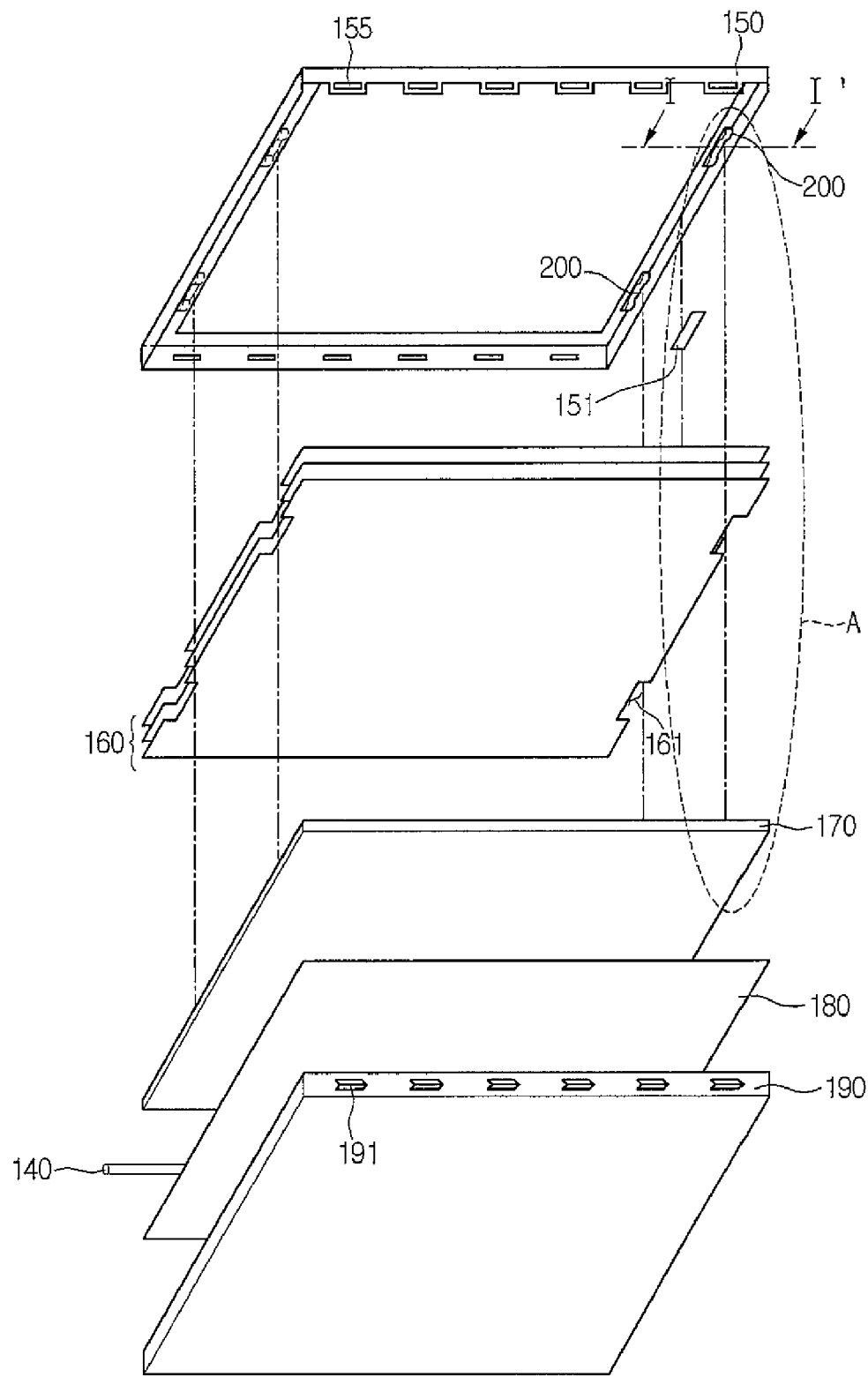
FIG. 2 is an exploded perspective view illustrating a rear surface of a backlight unit depicted in FIG. 1.
Figure 3:
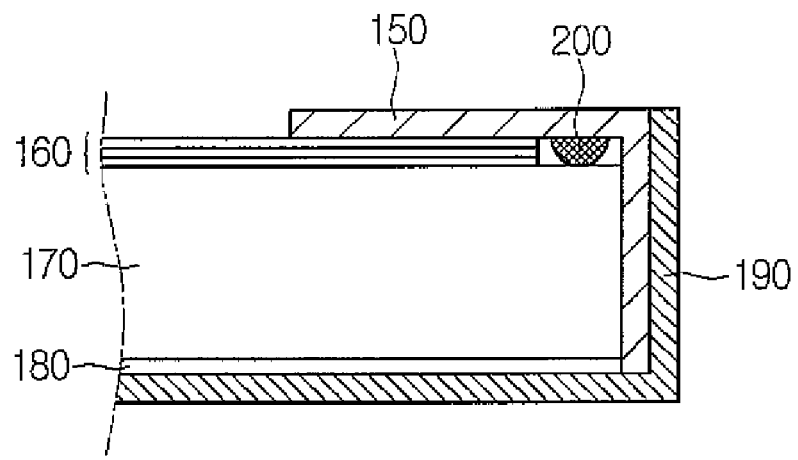
FIG. 3 is a view taken along ling I-I' of FIG. 2.

FIG. 1 is an exploded perspective view of a liquid crystal display (LCD) device according to an embodiment, FIG. 2 is an exploded perspective view illustrating a rear surface of a backlight unit depicted in FIG. 1, and FIG. 3 is a view taken along ling I-I' of FIG. 2.

As shown in FIG. 1 a liquid crystal display (LCD) device of an embodiment includes an LCD panel 110 for displaying an image, a backlight unit 130 provided on a rear surface of the LCD panel 110 to emit light to the LCD panel 110, and a driving unit 120 for generating driving signals for displaying the image on the LCD panel 110.

The LCD panel 110 includes a thin film transistor (TFT) array substrate and a color filter substrate that are disposed to face each other and attached to each other with a predetermined cell gap therebetween and a liquid crystal layer interposed between the TFT array substrate and the color filter substrate.

The driving unit 120 on which a driving circuit for providing the driving signals to the LCD panel 110 is electrically connected to a side of the LCD panel by a tap 121 formed in a tape carrier package structure.

The driving unit 120 is electrically connected to the LCD panel 110 to transfer control and data signals to a plurality of gate and data lines (not shown) formed in the LCD panel 110, thereby driving pixels of the LCD panel 110.

The backlight unit 130 includes a bottom cover 190 formed in a rectangular box shape having an opened top, at least one lamp 140 provided on an inner-side surface of the bottom cover 190, a light guide plate 170 arranged in parallel to the lamp 140, a variety of optical sheets 160 disposed on the light guide plate 170 to diffuse and collect the light, and a reflective sheet 180 disposed on a rear surface of the light guide plate 170 to reflect the light directed toward the rear surface of the light guide plate 170 toward the optical sheets 160.

The backlight unit 130 further includes a support main 150 formed in a rectangular frame shape, which is coupled to the bottom cover 190 while enclosing edges of the lamp 140, light guide plate 170, optical sheets 160, and reflective sheet 180.

The lamp 140 includes a glass tube, inert gases filled in the glass tube, phosphors applied on an inner surface of the glass tube, and electrodes installed on opposite ends of the glass tube. When a high voltage is applied from an inverter (not shown) to the high voltage electrodes, electrons are discharged and collide with the inert gases filled in the glass tube, in the course of which an amount of the electrons are exponentially increased. The inert gases are excited by the increased electrons to generate an energy by which mercury is excited to discharge ultraviolet rays. The ultraviolet rays collide with the phosphors applied on the inner wall of the glass tube, thereby emitting visible light.

The lamp 140 may be one of a cold cathode fluorescent (CCFL) tube, a hot cathode fluorescent (HCFL) tube, an external electrode fluorescent (EEFL) tube, and an external & internal electrode fluorescent (EIEFL) tube.

The light guide plate 170 is formed of a poly methyl methacrylate (PMMA) material. The light guide plate 170 is formed in a wedge shape whose thickness is gradually reduced as it goes away from a light incident surface on which the lamp 140 is disposed. A prism pattern may be formed on the rear surface of the light guide plate 170 to refract the incident light toward the optical sheets 160.

The optical sheets 160 includes a diffusing sheet for diffusing the light, a light collecting sheet for collecting the light, and a protective sheet for protecting the light collecting sheet.

The diffusing, light collecting, and protective sheets are disposed on the light guide plate 170.

The support main 150 is formed of a plastic material such as a polyethylene-terephthalate material (PED) material having elasticity.

A plurality of hook structures 155 and 191 are formed on opposing side surfaces of the support main 150 and opposing side surfaces of the bottom cover 190 that correspond to the opposing side surfaces of the support main 150.

An adhesive tape 151 for fixing the optical sheets 160 is attached on an inner edge of a side of the support main 150.

The adhesive tape 151 prevents the optical sheets 150 from moving in a direction X-X' and allows the optical sheets 160 to contact and expand in a first direction considering that the optical sheets 160 contacts and expands in a second direction by heat. That is, the adhesive tape 151 is provided to fix the optical sheets 160 and prevent the optical sheets 160 from being bent.

The adhesive tape 151 may be formed of a rubber material and be applied at a surface thereof with a viscosity material so that it can be fixed to the support main 150.

A plurality of fixing protrusions for fixing the light guide plate 170 are formed on both inner edges of the support main 150.

The fixing protrusions 200 contacts an edge region of the light guide plate 170 through notches 161 formed on both sides of the optical sheets 160, thereby preventing the light guide plate 170 from moving in the direction X-X'.

The fixing protrusions 200 are integrally formed during a process for manufacturing the support main 150.

According to the LCD device of the embodiment, no separate member (such as silicon pads) for fixing the light guide plate 170 is provided. Instead, the fixing protrusions 200 are integrally formed with both side edges of the support main 150 to fix the light guide plate 170, thereby reducing the number of components and the costs for the components.

In addition, according to the LCD device of the embodiment, since the fixing protrusions 200 for fixing the light guide plate 170 are integrally formed with the support main 150, the assembling error that may be caused by pads that are used in the related art LCD device can be prevented.

Figure 4:
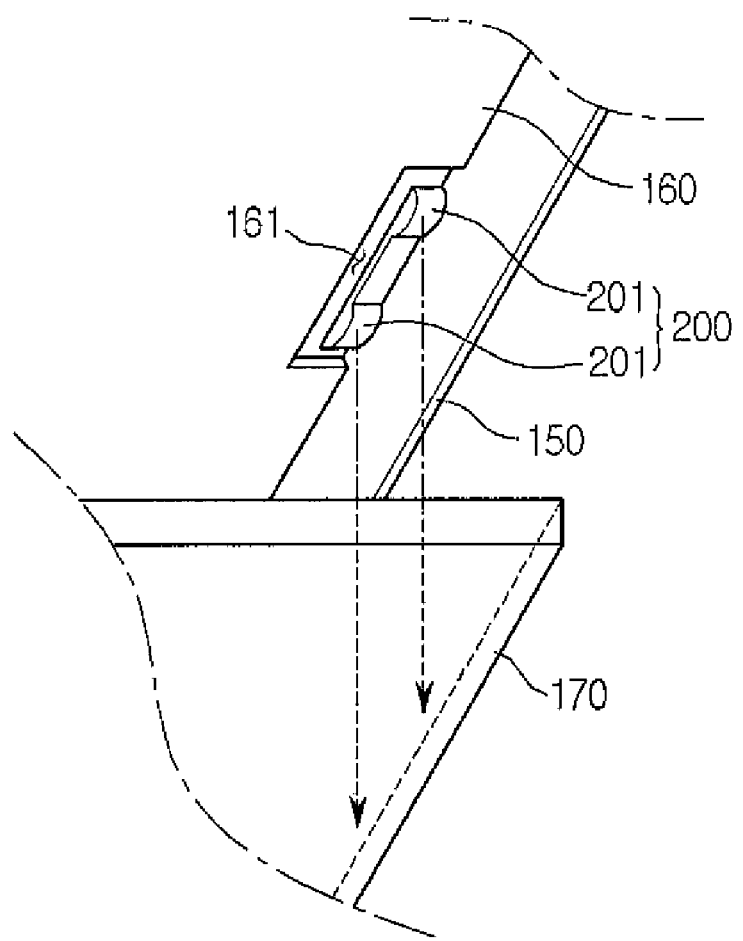
FIG. 4 is an enlarged view of a portion A of FIG. 2.

FIG. 4 is an enlarged of a portion A of FIG. 2.

As shown in FIG. 4, the fixing protrusions 200 are integrally formed on the inner both side edges of the support main 150, i.e., on a non-active region of the LCD device.

The fixing protrusions 200 are formed in a bar shape. A pair of protrusions 201 are formed on opposite ends of each of the fixing protrusions 200. That is, each of the fixing protrusions 200 has a pair of peaks and one valley.

The fixing protrusions 200 pass through the notches 161 formed on the optical sheets 160 and contacts the corresponding edge region (see arrow) of the light guide plate 170.

Figure 5:
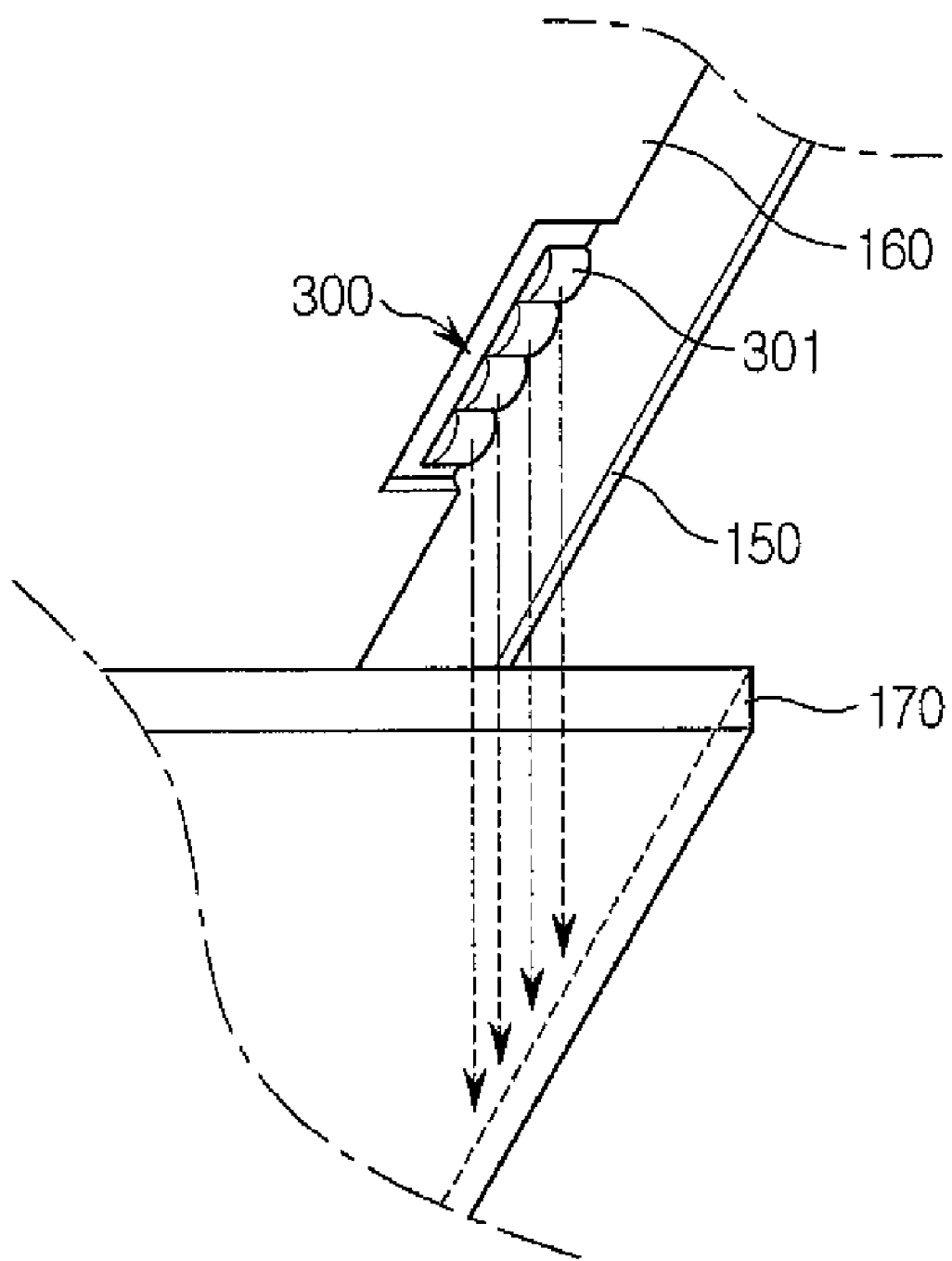
FIG. 5 is a view of a support main according to another embodiment.

FIG. 5 is a view of a support main according to another embodiment.

As shown in FIG. 5, a support main 150 of this embodiment is provided with fixing protrusions 300 formed at identical locations to the fixing protrusions 200 of FIG. 4. This embodiment is substantially same as the foregoing embodiment except for the fixing protrusions 300. Therefore, like reference numbers will be used to refer to like parts and a detailed description of the like parts will be omitted herein.

In this embodiment, the fixing protrusions 300 are formed in a bar shape and have a plurality of protrusions 301 protruding toward the light guide plate 170.

That is, each of the fixing protrusions 300 is formed with a plurality of peaks and a plurality of valleys.

The protrusions of the fixing protrusions 300 contact a corresponding edge region (see arrows) through the notches of the optical sheets.

Since each of the fixing protrusions 300 has a plurality of protrusions 301, the support main 150 can more securely fix the light guide plate 170.

As describe above, according to the LCD device of this embodiment, since the fixing protrusions 300 each having the plurality of protrusions 301 are integrally formed on the both inner edges of the support main body 150, the support main body 150 can securely fix the light guide plate 170 without using separate components (e.g., silicon pads). Therefore, the number of components and a component cost can be reduced.

According to the present disclosure, since the fixing protrusions 300 for fixing the light guide plate 170 are integrally formed with the support main 150, the assembling error that may be caused by pads that are used in the related art LCD device can be prevented.

In the above-described embodiments, the fixing protrusions 200, 300 having the protrusions 201, 301 are exemplarily described and thus the present disclosure is not limited to these configurations. For example, instead of forming the protrusions 201, 301, grooves may be formed on each of the fixing protrusions 200, 300.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   at least one light source;
   a light guide plate provided in parallel to the light source;
   a plurality of optical sheets disposed on the light guide plate;
   a support main enclosing the light guide plate; and
   a plurality of fixing protrusions that are formed on an inner edge of the support main to fix the light guide plate,
   wherein the support main and the fixing protrusions are formed in one body,
   wherein the fixing protrusions are protruded from a lower surface of the support main in a downward direction,
   wherein the fixing protrusions are directly contacted with an upper surface of the light guide plate, and
   wherein the lower surface of the support main is directly contacted with a part of an upper surface of the optical sheets, and a plurality of inside surfaces of the support main are directly contacted with a plurality of edge surfaces of the light guide plate.

2. The backlight unit according to claim 1, wherein each of the fixing protrusions includes at least one protrusion that protrudes based on the inner edge of the support main.

3. The backlight unit according to claim 2, wherein the protrusions are formed to provide peaks and valleys or one.

4. The backlight unit according to claim 1, wherein the fixing protrusions correspond to notches formed on both sides of the optical sheets.

5. A liquid crystal display device comprising:
   a liquid crystal display panel;
   a light source emitting light toward the liquid crystal display panel;
   a light guide plate provided in parallel to the light source;
   a plurality of optical sheets disposed on the light guide plate;
   a support main enclosing the light guide plate; and
   a plurality of fixing protrusions that are integrally formed on an inner edge of the support main to fix the light guide plate,
   wherein the support main and the fixing protrusions are formed in one body,
   wherein the fixing protrusions are protruded from a lower surface of the support main in a downward direction,
   wherein the fixing protrusions are directly contacted with an upper surface of the light guide plate, and
   wherein the lower surface of the support main is directly contacted with a part of an upper surface of the optical sheets, and a plurality of inside surfaces of the support main is directly contacted with a plurality of edge surfaces of the light guide plate.

6. The liquid crystal display device according to claim 5, wherein each of the fixing protrusions includes at least one protrusion that protrudes based on the inner edge of the support main.

7. The liquid crystal display device according to claim 6, wherein the protrusions are formed to provide peaks and valleys or one.

8. The liquid crystal display according to claim 5, wherein the fixing protrusions correspond to notches formed on both sides of the optical sheets.

9. The backlight unit according to claim 1, wherein the support main is formed of a plastic material.

10. The backlight unit according to claim 1, wherein the support main includes a plurality of hook structures on opposing side surfaces of the support main.

11. The liquid crystal display device according to claim 5, wherein the support main is formed of a plastic material.

12. The liquid crystal display device according to claim 5, wherein the support main includes a plurality of hook structures on opposing side surfaces of the support main.

13. The liquid crystal display device according to claim 5, wherein the liquid crystal display panel is disposed on an upper surface of the support main.

* * * * *